United States Patent [19]

Kumar et al.

[11] 4,077,871
[45] Mar. 7, 1978

[54] SEPARATION OF COLORED PARTICULATE GLASS

[75] Inventors: Tribhawan Kumar, Madison, Wis.; Booker W. Morey, Pasadena, Calif.

[73] Assignee: Occidental Petroleum Corporation, Los Angeles, Calif.

[21] Appl. No.: 567,549

[22] Filed: Apr. 14, 1975

[51] Int. Cl.$^2$ ............................................. B07B 13/00
[52] U.S. Cl. ........................................ 209/4; 209/11; 209/49; 209/111.7 T
[58] Field of Search ...................... 209/4, 49, 106, 1, 3, 209/11, 111.6, 111.7 R, 111.7 T, 111.5

[56] References Cited

U.S. PATENT DOCUMENTS

| | | | |
|---|---|---|---|
| 2,189,124 | 2/1940 | Bierbrauer | 209/49 |
| 2,358,055 | 9/1944 | Cahn | 209/49 |
| 2,468,472 | 4/1949 | Townsend | 209/49 X |
| 2,907,456 | 10/1959 | Brison | 209/49 X |
| 3,097,160 | 7/1963 | Rich | 209/4 |
| 3,114,703 | 12/1963 | Brison | 209/11 |
| 3,463,310 | 8/1969 | Ergon | 209/11 X |
| 3,749,562 | 7/1973 | Nicholas et al. | 65/34 |
| 3,837,826 | 9/1974 | Sawyer | 65/17 X |
| 3,980,180 | 9/1976 | Jamieson | 209/111.6 |

Primary Examiner—Bernard Nozick
Attorney, Agent, or Firm—Max Geldin; William N. Patrick; William G. Lane

[57] ABSTRACT

Process for color sorting of particulate glass employing as the basic concept the differential heating by irradiation and absorption of preselected colored glass particles and contacting such irradiated and differentially heated glass particles with an organic thermoplastic material which melts over a narrow temperature range, the preselected colored glass particles being heated by such irradiation to within the aforementioned temperature range and causing melting of the organic thermoplastic material in contact with such glass particles but without causing melting of the inorganic thermoplastic material in contact with the other glass particles, and thereby enabling separation of the differentially heated colored glass particles in contact with the melted organic material from the remaining glass particles.

According to one feature of the invention for carrying out the above concept, a mixture of particulate colored glass such as amber and flint glasses are coated with 1-tetradecanol, and the amber glass is differentially heated by irradiaton to a temperature in excess of 38° C., causing melting of the tetradecanol, the temperature of this coating on the flint glass being insufficient to melt the coating. The mixture is placed in a froth flotation apparatus in which the amber glass containing the previously melted alcohol coating floats, while the flint glass on which the alcohol coating was not melted, does not, permitting removal of the amber glass, the flint glass remaining in the pulp in the machine.

According to another embodiment for carrying out the invention concept, a surface in the form of a glass sheet is coated with 1-tetradecanol, and a mixture of amber and flint glasses are irradiated causing heating of the amber glass absorbing the irradiation to above 38° C while the flint glass which does not absorb such irradiation is not heated to above 38° C. The resulting glass particles are poured upon the tetradecanol coated glass sheet, and following cooling to room temperature the differentially heated amber glass adheres to the alcohol coating while the flint glass does not so adhere and falls off the sheet.

33 Claims, 10 Drawing Figures

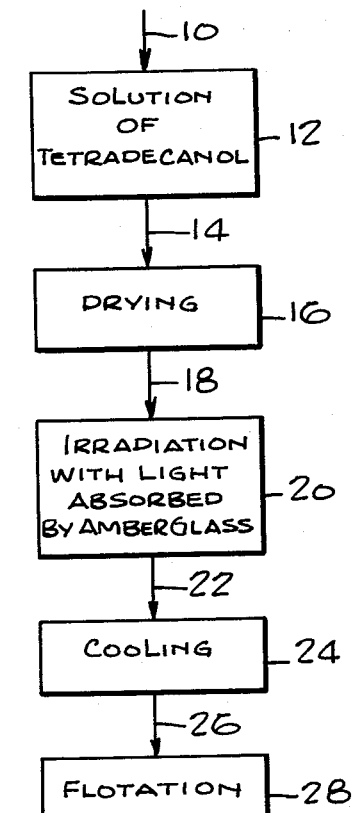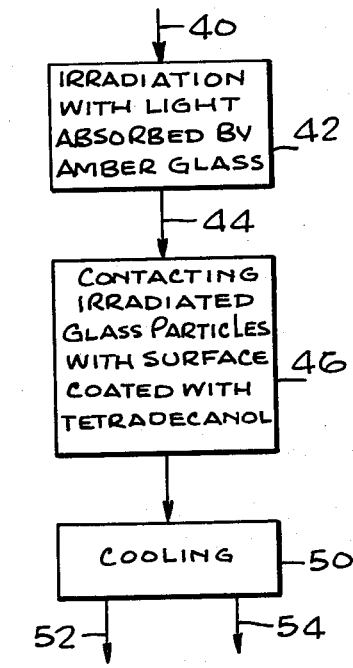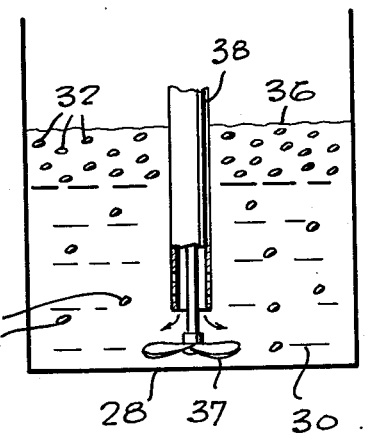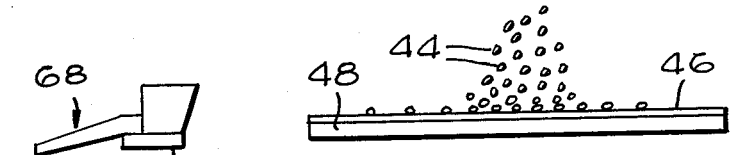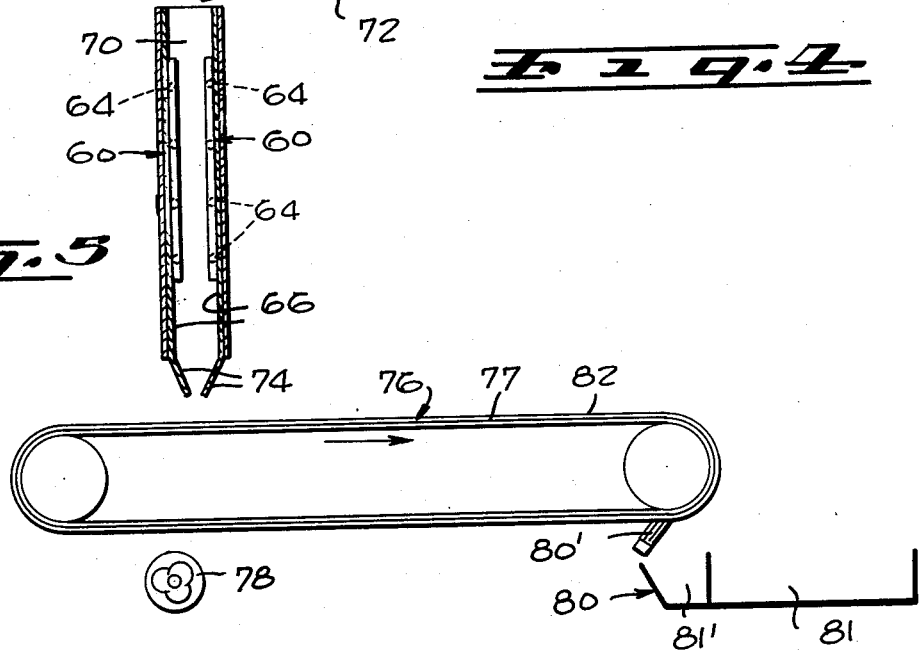

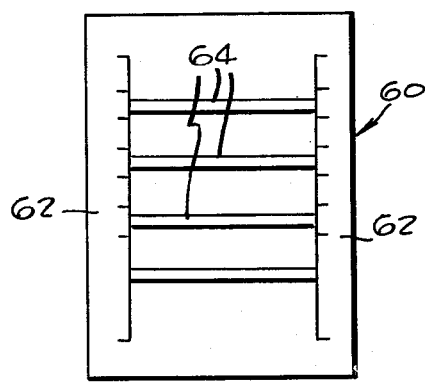
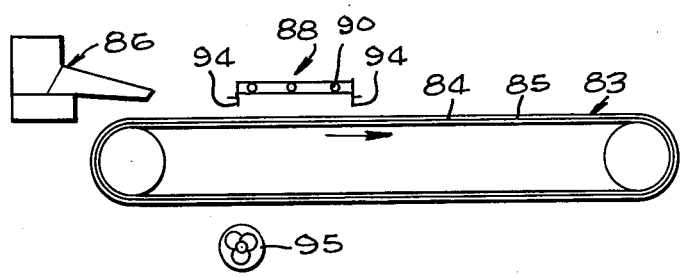
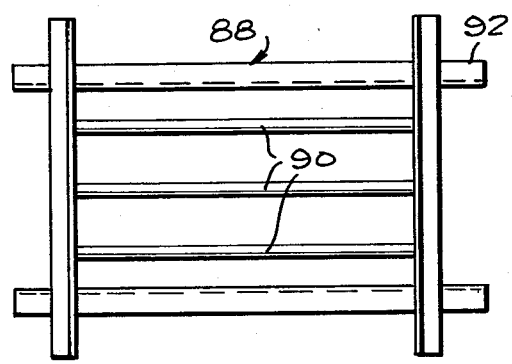
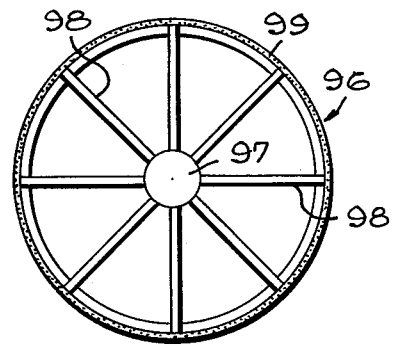
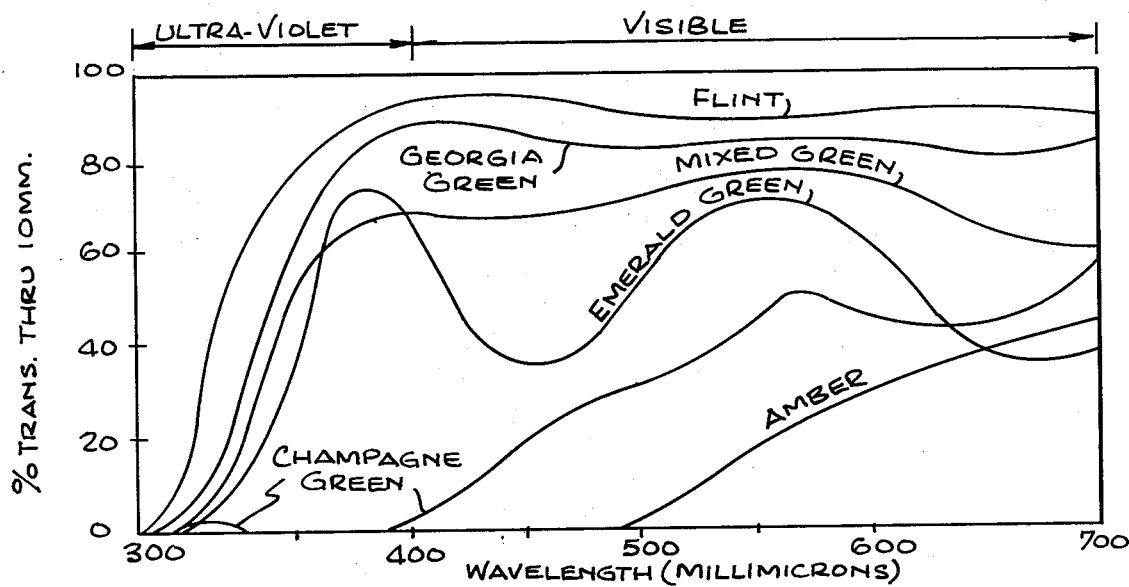

SEPARATION OF COLORED PARTICULATE GLASS

BACKGROUND OF THE INVENTION

This invention relates to the separator of particulate glass, and is particularly concerned with procedure for the color sorting of multi-colored glass particles in particulate glass, especially particulate glass recovered by froth flotation from shredded municipal trash or waste, by procedure which involves differential heating of particles of glass of a preselected color or colors, by light absorption of such glass particles, and contacting such glass particles with an organic thermoplastic material in the form of a coating on the glass particles or on a separate surface, causing melting of such organic thermoplastic material in contact with the thus differentially heated colored glass particles and permitting separation thereof from the remaining glass particles as by flotation or adhesion.

Although the particulate glass recovered by froth flotation from shredded municipal trash can be made clean enough for recycling, wide adoption of such process is limited because the particulate glass is generally of mixed colors. Thus, for example, particulate glass thus obtained and contaminated with relatively small amounts of green glass, e.g. of about 5 to about 8%, can only be melted to a green or amber glass. Substantially the only use for green glass as made in a furnace appears to be for bottles, which is only approximately 10% of total bottle production. For all other uses of green such as for pressware, e.g. glasses, salad dishes, novelties, and the like, the green glass is made by forehearth addition of pigments to the otherwise flint cullet, and is generally made between large production runs. Thus, the color is added after the glass is made, and only to the quantities of glass needed for the particulate item or items.

Although it was found that particulate glass can be color-sorted by magnetic separation, an economically feasible method employing this principle has not as yet been developed. Other magnetic sorting approaches using paramagnetic fluids to establish magnetically sensitive density gradients have also been tried without success.

It is accordingly a particular object of the present invention to provide novel procedures and systems for efficiently sorting particulate colored glass, especially colored glass obtained by froth flotation of municipal waste, to obtain a relatively clean separation of one or more preselected colors of the particulate glass in the mixture, from other colored glasses present.

DESCRIPTION OF THE INVENTION

It has been found according to the present invention that by differential heating, preferably by irradiating glass particles with light absorbed by the colored glass of one or more colors to be separated, to thereby raise differentially the temperature of the glass absorbing such light, and contacting the resulting differentially heated or irradiated glass mixture with an organic thermoplastic material which melts in a narrow temperature range through which the preselected colored glass was differentially heated by light absorption, thereby causing melting of such organic thermoplastic material in contact with the latter differentially heated colored glass particles but without causing melting of the organic thermoplastic material in contact with the remaining glass particles not heated to the melting point of the thermoplastic material, a separation of the differentially heated colored glass particles from the remaining glass particles can be achieved by various means, including froth flotation or adhesion, as described in greater detail hereinafter.

Thus, by practice of the invention procedure, amber glass particles can be separated from a particulate glass mixture containing amber and flint glass particles; or green glass can be separated from a mixture of particulate glass containing green and flint glass particles; or amber and/or green particles can be separated from a particulate glass mixture containing amber, green and flint glass particles. Thus, the invention provides a means of color sorting of glass particles of one or more different colors from a mixture containing such multi-colored glass particles.

The basic invention concept permits separation or color sorting of multi-colored particulate glass, according to one embodiment, by froth flotation. According to this embodiment the process comprises deposition on glass particles of at least two different colors a substantially transparent non-adherent coating of an organic thermoplastic material which melts over a narrow temperature range, irradiating the glass particles with light of a wave length which is absorbed by glass particles of a preselected color such as amber, and essentially non-absorbed by the remaining glass particles, e.g. flint (colorless) glass, thereby causing a differential heating of the preselected colored glass particles to a temperature higher than the other glass particles and which is within the narrow melting range of the organic thermoplastic coating on such preselected colored glass particles, thereby causing melting and adhesion of such coating, but without causing melting of the inorganic thermoplastic coating on the remaining glass particles, and separating the preselected colored glass particles containing the melted thermoplastic coating from the remaining glass particles by froth flotation, the melted thermoplastic coating adhering to the preselected colored glass particles causing such particles to float, whereas the remaining glass particles containing the initial unmelted non-adherent coating remain in the body of fluid in the flotation apparatus, the floating colored glass particles being readily removable from the flotation apparatus. This modification of the invention process is referred to herein as the "flotation" concept.

According to a second modification or embodiment of the invention concept, there is provided a process which comprises irradiating glass particles of at least two different colors with light of a wave length which is absorbed by preselected colored glass particles such as amber glass, and essentially non-absorbed by the remaining glass particles such as flint glass, thus causing a differential heating of the preselected color or amber glass particles to a temperature higher than the remaining, e.g. flint glass particles, contacting the irradiated and differentially heated glass particles, as by dropping such particles by gravity, with a surface, e.g. a glass or metallic surface, coated with an organic thermoplastic material of the aforementioned type which melts over a narrow temperature range, the preselected colored glass being heated by irradiation as noted above, to a temperature within the narrow melting range of the organic thermoplastic material, causing melting of such thermoplastic coating contacted by the differentially heated preselected colored glass particles, cooling the coated surface and particulate glass in contact therewith and causing adherence of the differentially colored glass particles to the coated surface but substantially without causing adherence of the remaining glass particles to the coated surface, thereby separating the differentially heated colored glass particles from the remaining glass particles.

The invention will be more clearly understood from the detailed description below, taken in connection with the accompanying drawing wherein:

FIG. 1 is a schematic illustration of one preferred embodiment of the invention process;

FIG. 2 illustrates the process according to FIG. 1, utilizing a flotation device for separation of the glass particles containing the previously melted organic thermoplastic coating, from the remaining glass;

FIG. 3 is a schematic illustration of another feature of the invention process;

FIG. 4 illustrates contacting the irradiated glass particles with a glass surface coated with an organic thermoplastic material;

FIG. 5 illustrates a modified form of apparatus for carrying out the process illustrated in FIG. 3;

FIG. 6 is an elevational view of a portion of the apparatus shown in FIG. 5;

FIG. 7 is an illustration of a still further modification of apparatus which can be used for carrying out the invention illustrated in FIG. 3;

FIG. 8 illustrates a portion of the apparatus of FIG. 7;

FIG. 9 illustrates a still further modification of apparatus for carrying out the process illustrated in FIG. 3; and FIG. 10 is a plot of transmission spectra for differently colored glasses.

With respect to the procedure for color sorting of glass using the first feature of the invention noted above, namely the flotation aspect, and referring to FIG. 1 of the drawings, a colored particulate glass, e.g. a mixture of amber and flint glass particles of a mesh size ranging from about 20 to about 200 mesh, and obtained by froth flotation of municipal trash, and indicated at 10, are coated with a transparent organic thermoplastic material which melts over a preselected narrow temperature range. Although varying types of organic thermoplastic materials can be employed for purposes of the present invention, it has been found that organic thermoplastic materials in the form of a long chain primary alcohol which is solid at room temperature are preferred. Such alcohols preferably are those having from about $C_{12}$ to about $C_{20}$ aliphatic primary chains. Examples of such alcohols include tetradecanol, particularly 1-tetradecanol or n-tetradecanol, pentadecanol, hexadecanol, heptadecanol, and the like. 1-tetradecanol is a particularly desirable coating material, since it can be obtained having a sharp melting range of between about 38 to 38.5° C.

The particulate colored glass mixture 10 is coated with such organic thermoplastic material, e.g. 1-tetradecanol, by immersion of the particulate glass in a solution of the organic thermoplastic material, as indicated at 12, e.g. an acetone solution of the tetradecanol. If desired, a small amount of a material such as gum tragacanth can be added to the solution for increasing the adherence of the long chain alcohol to the glass particles.

The resulting coated glass particles at 14 are removed from the tetradecanol solution, the solution permitted to drain from the glass particles and the particles are dried at a suitable temperature, but well below 38° C when employing the above-noted tetradecanol coating, as indicated at 16.

All of the resulting dried and coated glass particles at 18 are then irradiated with light absorbed by the amber coated glass particles, at 20, causing the amber glass to be heated to a temperature above 38° C, say in the range between about 39 and 47° C, and above the melting point of the 1-tetradecanol coating on such glass particles, causing such tetradecanol coating on the amber glass particles to melt. On the other hand, the coating on the flint glass particles which did not absorb the light remained at a temperature below 38° C and below the melting point of the 1-tetradecanol coating on such glass particles, so that such coating did not melt.

If desired, during or subsequent to drying of the glass particles and prior to irradiation, the mixture of glass particles at 18 can be heated to a temperature up to say about 30° to 35° C, but well below the approximately 38° C melting point of the 1-tetradecanol coating on the glass particles. This facilitates subsequent heating of the tetradecanol coating on the glass particles which absorb light, up to and through the melting point of the tetradecanol.

However, the glass particles which absorb light can be heated optically from about ambient temperature of between about 20° and 25° C, to a temperature in excess of 38° C without any prior heating of the particulate glass mixture. Following irradiation of the glass particles, the resulting mixture of glass particles at 22 is cooled at 24 and the cooled particles at 26 are introduced into a flotation bath as indicated at 28 in FIGS. 1 and 2, comprised of a body of water, in which additives can be incorporated to facilitate the flotation operation. A typical form of flotation cell which can be used in the invention process is a Wemco flotation cell.

The previously melted tetradecanol coating on the amber glass particles adheres to such particles in the flotation bath and the alcohol coating is sufficiently hydrophobic so as to cause the coated amber glass particles to remain essentially unwetted and to float on the body of water 30 in the flotation cell, as indicated at 32 in FIG. 2. On the other hand, the unmelted coating remaining on the flint glass particles becomes essentially nonadherent to such particles when introduced into the flotation bath, and is loosened and removed from these glass particles in the bath, causing such particles to become wetted and dispersed in the body of flotation liquid, as indicated at 34. The floating particles of tetradecanol-coated amber glass at 32 can be removed by suitable conventional means from the surface of the body of liquid 30 in the flotation cell.

In preferred practice, although not necessary, certain additives can be incorporated in the flotation bath to facilitate the flotation or froth flotation operation. Thus, a small amount, for example in the range of about 0.005 – 0.05%, such as about 0.025%, of a "collector" can be added to the flotation cell, to function by attaching itself or adhering to the tetradecanol-coated amber glass, but not adhering to the flint glass from which the coating is removed in the flotation bath. This provides for a more effective separation of the coated amber glass particles from the flint glass particles in the flotation bath. Examples of collectors which can be employed can be in the form of a long chain fatty acid of from about 12 to about 22 carbon atoms, examples of which are the oleic acid type, e.g. as represented by the material marketed as Hercules Pamak W4. Other materials giving similar results can be employed such as the terpene alcohols as represented by pine oil.

In addition, there can also be incorporated into the flotation bath a "frother" which functions to create a stabilized foam or froth, as indicated at 36 in FIG. 2, which contains the tetradecanol-coated amber glass particles 32, and aids in separating such glass particles from the body of water 30. Any commercially available frother can be employed for this purpose, such as small amounts, say in the range of about 0.0005 – 0.002%, e.g. about 0.001%, of a polyethylene oxide, as represented by the material marketed as Dow Frother-250, and carbinols of from about 4 to about 10 carbon atoms, including for example, methyl isobutyl carbinol, hexanol and branched chain octanols.

In normal practice, the flotation bath is agitated by means of an impeller as indicated at 37, and air is incorporated into the bath as through the hollow impeller shaft 38, to facilitate froth formation.

As previously noted, it is possible to operate without either a collector or a frother, since the tetradecanol-coated amber glass coating is sufficiently hydrophobic to be removed as a froth from the flotation cell.

Following removal of the coated amber glass particles from the flotation bath, as indicated at 32 in FIG. 1, the tetradecanol coating on such glass particles can remain thereon since such coating does not affect reuse of the glass as cullet, or such coating can be removed by washing with a suitable solvent, e.g. acetone, or by heating to volatilize the alcohol. The particles of flint glass 32 remaining in the body of flotation liquid can be readily removed therefrom, as by filtration, thereby providing the desired separation between the amber and flint glass particles in the initial particulate glass mixture.

It is thus noted from the above that in the flotation concept or aspect of the invention, the organic thermoplastic compound, e.g. tetradecanol, which is water insoluble, displays the property of having a sharp melting range and of wetting glass when it is melted onto a surface of the amber glass particles by differentially heating the glass by irradiation. Flotation is selective because the coating on the flint glass particles and which was not melted during irradiation is removed or washed from these glass particles during flotation, whereas the tetradecanol coating which was melted onto the amber glass particles and which is attracted by the collector, remains unremoved, causing the last-mentioned glass particles to float to the surface of the flotation cell. Thus, flotation according to the present invention becomes temperature dependent, that is dependent on the use of a temperature which causes melting of the alcohol as by differential heating or irradiation of the amber glass and absorption of light thereby, and adhesion of such melted alcohol to the amber glass. It is preferred that the flotation operation be carried out over a short period of time, preferably not exceeding about 10 minutes, since otherwise the residual previously melted organic thermoplastic, e.g. tetradecanol, coating on the differentially heated, e.g. amber glass, will tend to flake and wash off the glass surface during the flotation operation.

The following are examples of practice of the flotation concept or aspect of the invention.

EXAMPLE 1

Amber glass of size −48 + 60 mesh was coated with 1-tetradecanol. The coating was deposited from a solution of tetradecanol in acetone. Flint glass of size −100 + 200 was coated similarly. The amber glass was heated in an oven which was at 41° C and the whole set-up was allowed to cool down to room temperature. The amber glass and the flint glass were then mixed in the ratio of 65% and 35% respectively. The mixture was transferred to a flotation cell and Hercules Pamak W4 (2 drops) and Dow Frother-250 (2 drops) were used as collector and frother. The amber glass floated while the flint glass did not. The resulting amber and flint glasses were separately collected. The percentage of flint glass remaining in amber was about 2.4% by weight, and of the amber remaining in flint was about 1.54%. It will be appreciated by those skilled in the art that it is more difficult to float larger particles from the smaller. This example clearly shows the ability of the melted-on tetradecanol to act as a coating and the non-melted tetradecanol to rapidly and completely wash off.

EXAMPLE 2

One hundred grams of a mixture of 50% flint and 50% amber glss in a size range of −20 +200 mesh are immersed in an acetone solution containing 2% by weight of n-tetradecanol. A small amount of gum tragacanth can be added to the solution. The glass is drained and dried at less than 38° C, and then spread out as a thin layer on a white or reflective surface. The glass is then exposed to a nearby 500 watt tungsten light source sufficient to raise the temperature of the amber glass about 38°, to 40° C while leaving the flint or colorless glass at a temperature below 38° C, for instance 36° C. The irradiation time, with the light source at a distance of six inches from the glass surface is between 5 and 10 seconds.

After cooling, all the glass is added to a froth flotation machine containing water, and to which is optionally added a fatty acid collector (Hercules Pamak W4, two drops) and a frother, methyl isobutyl carbinol. Upon agitation and introduction of air, a froth forms containing most of the amber glass, and flakes of alcohol coating that washed off the colorless glass without sticking thereto.

The froth containing the amber glass is removed from the body of water in the flotation apparatus, and the flint glass dispersed in the main body of water in the flotation apparatus, is removed separately therefrom.

Now considering the modification or embodiment of the invention directed to the feature or concept of the use of adhesion rather than flotation for color sorting of the glass particles employing the concept of differential heating by irradiation and absorption by a preselected glass contained in a glass mixture, this feature involves the deposition of an organic thermoplastic material of the type described above, and which melts over a narrow temperature range, e.g. a long chain primary alcohol, preferably 1-tetradecanol, on a suitable surface, such as a glass sheet or plate. The irradiated and differentially heated multi-colored glass mixture is then contacted or impinged on the coating on the substrate or glass surface, the differentially heated glass which absorbs light and is thus heated to a temperature in excess of the melting point of the tetradecanol-coated surface adhering thereto, while the remaining glass particles not absorbing the light and hence not heated to a temperature above the melting point of the alcohol coated surface, being non-adherent to such coating and falling from such coated surface.

In the process of this embodiment, referring to FIGS. 3 and 4 of the drawing, a colored particulate glass comprised of a mixture of amber and flint glasses, indicated at 40, is first subjected to irradiation by light of a wave length of about 350 to about 700 millimicrons, which is absorbed by the amber glass particles and is non-absorbed by or transmitted through the flint glass (colorless) particles. Such irradiation, as indicated at 42 in FIG. 3, results in light absorption by the amber glass which can heat such glass to a temperature above 38° C, while the flint glass particles remain at a temperature below 38° C.

The resulting differentially heated glass particles at 44 are impinged upon a coating 46 on the surface of a glass plate 48, as indicated in FIGS. 3 and 4. The coating 46 on the surface of plate 48 is a coating of an organic thermoplastic material having a narrow melting range as described above, preferably 1-tetradecanol. The hotter differentially heated amber glass particles which are at a temperature above the melting point of the tetradecanol coating on the glass plate causes melting of the coating at the point of contact of such particles with the alcohol coating, whereas the flint glass particles which are not heated to a temperature above 38° C do not cause melting of the tetradecanol coating at the points of contact of such particles with the coating. Following impingement of all of the glass particles 44 on the coating 46 of the glass surface, the entire system is permitted to cool, as indicated at 50, and after cooling, the glass plate is slanted or inverted, resulting in the flint glass particles 52 readily falling off the coated surface of the glass plate, whereas the amber glass particles 54 essentially adhere to the alcohol coating 46 on the plate. The amber glass particles 54 then can be readily removed from the tetradecanol coating to which they are adhered by a simple mechanical brushing of the plate.

In order to provide greater adherence of the hotter, that is amber, glass particles to the organic thermoplastic, e.g. tetradecanol, coated glass surface, the initial particular glass mixture can be coated with a material such as gum tragacanth or similar coupling agent, allowing better adhesion of the molten thermoplastic to the glass.

Instead of differentially heating the glass particles by irradiation followed by impinging or dropping such differentially heated glass particles onto the coated surface, such glass particles can be first dropped or impinged on the coated glass surface followed by irradiation and differential heating of the glass particles on the coated surface, to cause adherence of the hotter glass particles to the coating as result of melting of such coating at the points of contact with the hotter glass, whereas the remaining glass particles not heated to the melting point of the coating remain substantially non-adherent thereto.

The nature of the coating on the substrate, e.g. glass surface, should be as uniform, continuous and as thin as possible. The rougher the surface the less efficient the color sorting, particularly where glass of fine particle size is employed. The size of the glass particles are of some importance since the larger particles will tend to bounce off the coated surface after impingement thereon whereas the smaller particles will have less tendency to do so, leading to a difference in adhesion between large particles and smaller ones, to the coating. Further, where the source of irradiation, such as lights are mounted above the surface containing the coating and the glass particles are permitted to drop past the lights for irradiation and down onto the coated surface, the smaller or lighter glass particles will tend to fall slower past the lights and thus heating more than the larger glass particles from the lights. Thus, in available glass mixtures ranging from −20 +200 mesh, cuts can be made of for example −20 +48 mesh, −48 +100 and −100 +200 mesh, and these individual cuts of more uniform particle size individually employed.

Also, various types of substrates or surfaces can be employed on which the organic thermoplastic coating is applied. In addition to glass, for example, metallic or plastic surfaces can be employed and such surface can be a stationary surface such as a stationary glass plate illustrated in FIG. 4 or in the form of a movable belt having a coating of the organic thermoplastic material, e.g. tetradecanol, thereon.

Thus, for example, there can be employed a surface such as glass or metal with a smooth organic thermoplastic coating, rough coatings not being preferred since embedment therein could occur of some of the glass particles, e.g. flint particles, not differentially heated to above the melting point of the coating. The ease of removal of the optically heated glass particles adhered to or embedded in the coating depends on the nature of the coating, including the uniformity thereof, and the extent of adhesion of the particles. Usually such removal can be accomplished readily by simply inverting the coated surface or by means of a scraper blade or similar device.

It is preferred to maintain the coated surface with the differentially heated glass particles in contact therewith cooled during the impingement operation, so as to facilitate adherence of the hotter glass particles contacted or impinged upon the coated surface, while facilitating removal of those glass particles not differentially heated to above the melting temperature of the organic thermoplastic coating, and which are not adherent to the coating.

Referring to FIGS. 5 and 6 illustrating a modified form of apparatus for carrying out the adhesion feature of the invention there is shown a frame 60 having suitably mounted across opposite sides 62 of such frame, a plurality, here shown as four in number, of tubular lamps 64, such as G.E. tungsten halogen lamps. Two sets of such frames 60 containing lamps 64 suitably mounted vertically and spaced from each other. Aluminum foil 66 is wrapped on the surface of the frames 60 facing each other.

A particulate glass vibratory feeder 68 is mounted above the frames 60 containing the tubular lamps 64, so as to feed the particulate glass by gravity through the space 70 between the frames 60, and for example, about 2 inches from the tubular lamps 64. The bottom of the vibratory feeder 68 is covered with aluminum foil 72 to keep the feeder near ambient and constant temperature, and aluminum foil is also provided at 74 and depending from the lower ends of the frames 60 to permit as little radiation as possible from striking the belt 76 mounted below.

The movable belt 76 mounted below the frames 60 and lamps 64 carried thereon, can be for example, a white polynitrile belt covered with aluminum foil, at 77, although not necessarily so covered. Preferably, the belt 76 is formed of a material, or is covered with a material such as aluminum, which has low emissivity or absorption of incident radiation. A fan 78 is mounted below the belt to maintain constant ambient temperatures, and a compartmented container 80 is provided for collecting non-adhering glass particles at 81 falling from the belt 76, and for collecting adhering glass particles at 81' removed from the belt with a brush 80'. The aluminum foil surface 77 has applied thereto a coating 82 of a low melting organic thermoplastic material as described above, such as 1-tetradecanol.

The following is an example of practice of the invention employing the apparatus described above and illustrated in FIGS. 5 and 6.

EXAMPLE 3

Two of the lamps 64 mounted in each of the frames 60 were 1,000 watts, 230 volt lamps, and two of such lamps were 1500 watts and 230 volt lamps. These were tungsten halogen tubular lamps set 1½ inches apart vertically in each of the frames 60.

A particulate glass mixture (−20 + 32 mesh) of 60% amber and 40% flint was poured from the vibratory feeder 68 down through the space 70 between the lamp frames 60, and about 2 inches away from the respective lamps on each side of the fall. The length of fall of the glass exposed to light was about 20 inches, the length of the tubular lamps 64 was 10 inches each, with a filament length of 6 inches. The width of the glass stream falling between the lamps was 4 inches.

The white polynitrile belt wrapped with aluminum foil was coated with 1-tetradecanol dissolved in hexane, by means of a "flint" gun. The belt speed was adjusted to the maximum available of about 45 feet per minute.

A mixture of about 90% flint glass was obtained in compartment 81 as the portion that did not stick to the moving belt. Chiefly amber glass was obtained in compartment 81' as the portion that did stick to the moving belt and was removed therefrom by the brush 80'.

The residence time of the particulate glass mixture exposed to light from the lamps was about 1 second and the time following exposure and before the glass mixture contacted the coated surface of the belt was about 0.5 second. During the exposure to light the amber glass particles were differentially heated from about 25° to well above 38° C., the melting point of the 1-tetradecanol coating on the belt.

Referring to FIGS. 7 and 8 illustrating a still further modification of apparatus for carrying out the adhesion concept according to the invention, there is provided a movable belt 83, formed of white polynitrile, wrapped with aluminum foil 84, a coating 85 of 1-tetradecanol being applied over the aluminum foil in a manner as described above. A vibratory glass particles feeder 86 is placed at one end of the belt so as to feed the glass mixture onto the belt at one end thereof. A lamp system 88 is suspended about 1 inch above the belt 82. The lamp system 88 shown in FIG. 8 is comprised of three tubular shaped lamps 90 each of 500 watts, 120 volts, the length of each of the lamps being about 4¾ inches and the filament length about 2¼ inches. The lamps are tungsten halogen lamps and are mounted and spaced 1½ inches apart in a holder 92. From the opposite sides of the holder 92, aluminum foil 94 was hung so as to restrict the area exposed to light to the region just below the belt. The following is an example of practice of the invention employing the apparatus of FIGS. 7 and 8.

EXAMPLE 4

A particulate glass mixture of 50% flint glass (−32 + 48 mesh) and 50% amber glass (−20 + 32 mesh) was fed from the vibratory feeder 86 onto the coating 85 on the movable belt 83. The feed rate was about 45 to 50 grams per minute at a belt speed of about 45 feet per minute. Cooling was accomplished by means of a fan 95 positioned below the belt 83. A mixture of about 85% of flint glass was obtained as the portion which did not stick to the coated belt surface.

When a mixture of 70% of amber glass (−20 + 32 mesh) and 30% flint glass (−32 + 48 mesh) as the feed was used, a mixture of about 75% of flint glass was obtained as the portion which did not stick to the coated belt surface.

When a mixture of equal parts by weight of flint glass (32 + 48 mesh), amber glass (−20 + 32 mesh) and medium green glass (−20 + 32 mesh) was used, a mixture of 80% flint and 20% of a colored mixture of green and amber glass particles was obtained as the portion which did not stick to the coated belt surface.

It was found from tests carried out with the apparatus of FIGS. 7 and 8 that the lamps should be placed as close as possible to the movable belt without substantially touching the glass particles on the belt. It was further noted that the adhesion of glass to the coating on the belt employing the modification of FIGS. 7 and 8 is substantially greater than in the free fall system of FIGS. 5 and 6. The distance of the belt from the lamps in the apparatus illustrated in both FIGS. 5 and 7 should be constant in the region of exposure to light.

Other sources of light in addition to tungsten halogen lamps can be employed, such as infra-red, particularly coupled with visible light. The type of light employed will of course depend upon the colored mixture of particulate glass to be separated or sorted and particularly the colored glass which is to be optically or differentially heated by light absorption.

FIG. 9 illustrates a still further modification of apparatus for carrying out the adhesion concept of the invention. In this modification there is employed a revolving drum 96 mounted on an inner cylinder 97 by means of spokes 98, the inner cylinder 97 being suitably mounted on a shaft and bearings for revolving the drum. The outer drum or cylinder 96 is made as thin as possible with means (not shown) for suitably cooling the drum mounted on the inside thereof.

The organic thermoplastic coating 99 having a narrow melting range is applied to the outer surface of the drum 96, and suitable particulate glass loading and light exposure means (not shown) are mounted above the drum, such as the vibratory feeder system 68 and the system of frames 60 and attached lamps 64, as employed in the apparatus of FIGS. 5 and 6, for feeding colored particulate glass and irradiation thereof by suitable light, prior to impingement of the glass particles onto the coated surface 99 of drum 96. The glass particles which are not heated to a temperature sufficient to melt the coating 99, e.g. of 1-tetradecanol, on the surface of the drum, fall from the surface whereas those particles optically or differentially heated to a temperature above the melting point of the coating adhere to the coating and are suitably removed therefrom.

In many instances the colored particulate glass mixture to be separated or sorted may contain glass particles of more than two colors, such as three or more colors. Further, such mixture may contain different shades of one color, such as green, and it may be desirable to separate such different shades of the one color of glass. Thus, for example, a colored particulate glass mixture to be sorted according to the invention can comprise a mixture of emerald, Georgian and champagne greens, together with amber and flint glass.

Referring to FIG. 10 showing transmission spectra for the various glasses of such mixture, in order to separate amber from emerald and Georgian green glass, employing the above-noted heating by irradiation and light absorption principle, the abovenoted mixture of glass should be irradiated with light of a wave length of 350–575 millimicrons, which causes absorption in the amber and champagne green glasses, to permit removal of same from the Georgian and emerald green and flint glasses. To then remove the champagne green from the amber glass in the separated mixture, such mixture is irradiated with light of a wave length between 450 and 550 millimicrons, causing absorption by the amber and hence permitting removal of the amber from the champagne green. To separate Georgian and emerald green from the flint glass in the mixture thereof, such mixture should be irradiated with light from about 320 to 340 millimicrons causing absorption by the green glasses and permitting removal thereof from the flint glass. Although flint glass is colorless, it is considered herein as a glass of one color, in contrast to glass of another color such as green or amber.

Although the differential heating of the preselected glass particles to be separated is preferably carried out by irradiation including the visible and ultraviolet and infra-red ranges, and absorption of such light by glass particles of a preselected color, such differential heating also can be accomplished by other means such as microwave heating, dielectric heating, and the like.

From the foregoing, it is seen that the invention provides novel and efficient procedure for color sorting of a mixture of vari-colored glass particles of varying mesh size, e.g. from about 20 to about 200 mesh, and particularly adapted to processing of glass recovered by froth flotation from municipal waste, involving the basic concept of differential heating of preselected glass particles, preferably by irradiation and absorption, together with the concept of applying such differentially or optically heated glass particles to an organic thermoplastic material having a narrow temperature range to provide differential adhesion of the mixture of glass particles to such material, and thereby permitting a separation of the colored glass by flotation or by adhesion.

While we have described particular embodiments of our invention for purposes of illustration, it is understood that other modifications and variations will occur to those skilled in the art, and the invention accordingly is not to be taken as limited except by the scope of the appended claims.

What is claimed is:

1. A process for color sorting of particulate glass, which comprises differentially heating particulate glass of at least two different colors to cause a differential heating of first glass particles of one color in said particulate glass to a temperature higher than second glass particles of a second color in said particulate glass, contacting said particulate glass including said first differentially heated glass particles with an organic thermoplastic material which melts over a narrow temperature range, said first glass particles being differentially heated to a temperature within said temperature range and causing melting of said organic thermoplastic material in contact with said first glass particles but without causing melting of said organic thermoplastic material in contact with said second glass particles, and separating said first glass particles in contact with said melted organic material from said second glass particles.

2. A process for color sorting of particulate glass, which comprises irradiating glass particles of at least two different colors with light of a wave length which is absorbed by first glass particles of one color and essentially non-absorbed by second glass particles of a second color, thereby causing a differential heating of said first glass particles to a temperature higher than said second glass particles, contacting said irradiated and differentially heated glass particles with an organic thermoplastic material which melts over a narrow temperature range, said first glass particles being differentially heated by said irradiation to a temperature within said temperature range and causing melting of said organic thermoplastic material in contact with said first glass particles but without causing melting of said organic thermoplastic material in contact with said second glass particles, and separating said first glass particles in contact with said melted organic material from said second glass particles.

3. A process as defined in claim 2, wherein said particulate glass includes a mixture of at least two colors of glass including amber, green and flint (colorless) glasses.

4. The process as defined in claim 2, including initially heating said coated glass particles prior to irradiation to an elevated temperature below the melting point of said organic thermoplastic coating, prior to said irradiation.

5. The process as defined in claim 2, said organic thermoplastic material being a long chain primary alcohol which is solid at room temperature.

6. A process for color sorting of particulate glass, which comprises depositing on glass particles of at least two different colors a substantially transparent coating of an organic thermoplastic material which melts over a narrow temperature range, irradiating said glass particles with light of a wave length which is absorbed by first glass particles of one color and essentially non-absorbed by second glass particles of a second color, thereby causing a differential heating of said first glass particles to a temperature higher than said second glass particles, said first glass particles being differentially heated by said irradiation to a temperature within said narrow temperature range, thereby causing melting and adhesion of said organic thermoplastic coating on said first glass particles but without causing melting and adhesion of said organic thermoplastic coating on said second glass particles, and separating said first glass particles containing said melted thermoplastic coating from said second glass particles containing the initial unmelted thermoplastic coating, by froth flotation.

7. A process as defined in claim 6, wherein said particulate glass includes a mixture of at least two colors of glass including amber, green and flint (colorless) glasses.

8. The process as defined in claim 6, said organic thermoplastic material being a long chain primary alcohol which is solid at room temperature.

9. The process as defined in claim 8, said long chain primary alcohol containing from about $C_{12}$ to about $C_{20}$ aliphatic primary chains.

10. The process as defined in claim 9, wherein said alcohol is 1-tetradecanol.

11. The process as defined in claim 10, said glass particles being coated by immersing said particulate glass in a dilute aqueous solution of 1-tetradecanol and drying said particulate glass prior to said irradiation.

12. The process as defined in claim 8, including cooling said glass particles following irradiation, placing the mixture of said first glass particles containing said previously melted thermoplastic coating and said second particles containing said initial unmelted coating in a body of water in a froth flotation device, said melted thermoplastic coating adhering to said first glass particles and causing said first glass particles to be unwetted and to float, said initial unmelted coating on said second glass particles being essentially non-adherent to said second glass particles in said body of water, and being removed therein, and removing said first glass particles from said body of water, leaving said second glass particles therein.

13. The process as defined in claim 12, said body of water containing a collector material which adheres to said previously melted coating on said first glass particles but which does not adhere to the second glass particles.

14. The process as defined in claim 12, said body of water containing a frothing agent which creates a froth or foam of said first glass particles containing said previously melted thermoplastic coating to facilitate removal thereof from said body of water.

15. The process as defined in claim 12, said body of water containing a small amount of a collector material selected from the group consisting of long chain fatty acids to from about 12 to about 22 carbon atoms and terpene alcohols, which adheres to said previously melted coating on said first glass particles and facilitates flotation of said particles, and a small amount of frothing agent selected from the group consisting of polyethylene oxide and carbinols of from about 4 to about 10 carbon atoms, which creates a froth of said coated first glass particles to facilitate removal thereof from said body of water.

16. The process as defined in claim 15, wherein said organic thermoplastic material is 1-tetradecanol.

17. The process as defined in claim 16, said glass particles being coated by immersing said particulate glass in a dilute aqueous solution of 1-tetradecanol and a small amount of gum tragacanth.

18. A process for color sorting of particulate glass, which comprises irradiating glass particles of at least two different colors with light of a wave length which is absorbed by first glass particles of one color and essentially non-absorbed by second glass particles of a second color, thereby causing a differential heating of said first glass particles to a temperature higher than said second glass particles, contacting said irradiated and differentially heated glass particles with a surface coated with an organic thermoplastic material which melts over a narrow temperature range, said first glass particles being heated by said irradiation to a temperature within said narrow temperature range, causing melting of said organic thermoplastic coating contacted by said first glass particles, cooling said coated surface and particulate glass in contact therewith, causing adherence of said differentially heated first glass particles to said coated surface but substantially without causing adherence of said second glass particles to said coated surface, and separating said first glass particles from said second glass particles.

19. A process as defined in claim 18, wherein said particulate glass includes a mixture of at least two colors of glass including amber, green and flint (colorless) glasses.

20. The process as defined in claim 18, said surface being a glass surface coated with said organic thermoplastic material, said particulate glass being contacted with said coated glass surface by pouring said differentially heated particulate glass on said coated glass surface.

21. The process as defined in claim 20, wherein said organic thermoplastic material is 1-tetradecanol, and including coating said particulate glass prior to said differential heating thereof, with gum tragacanth, by contacting said particulate glass with a dilute aqueous solution of gum tragacanth.

22. The process as defined in claim 18, wherein said particulate glass is irradiated and differentially heated during contact of said particulate glass with said coated surface.

23. The process as defined in claim 22, wherein said particulate glass is dropped by gravity onto said coated surface, said surface being a movable belt coated with said organic thermoplastic material, and passing said moving belt with said particulate glass in contact with the coated surface thereon beneath a plurality of lights for said irradiating said glass particles.

24. The process as defined in claim 23, said belt being coated with 1-tetradecanol.

25. The process as defined in claim 18, said organic thermoplastic material being a long chain primary alcohol which is solid at room temperature.

26. The process as defined in claim 25, including coating said particulate glass prior to said differential heating thereof, with gum tragacanth.

27. The process as defined in claim 25, said long chain primary alcohol containing from about $C_{12}$ to about $C_{20}$ aliphatic primary chains.

28. The process as defined in claim 27, wherein said alcohol is 1-tetradecanol.

29. The process as defined in claim 25, wherein said surface is a moving belt covered with aluminum foil, said organic thermoplastic coating being disposed on said aluminum foil.

30. The process as defined in claim 18, wherein said particulate glass is dropped by gravity past a plurality of lamps for said irradiating said glass particles, onto said coated surface, said surface being a moving belt coated with said organic thermoplastic material.

31. A process as defined in claim 24, wherein said particulate glass includes a mixture of at least two colors of glass including amber, green and flint (colorless) glasses.

32. The process as defined in claim 30, said moving surface being a moving belt coated with a long chain primary alcohol containing from about $C_{12}$ to about $C_{20}$ aliphatic primary chains.

33. The process as defined in claim 25, said belt coated with 1-tetradecanol.

* * * * *